(12) United States Patent
Watts

(10) Patent No.: US 11,346,811 B1
(45) Date of Patent: May 31, 2022

(54) METHOD AND APPARATUS FOR IDENTIFYING DISCONTINUITY IN WALL OF FERROUS OBJECT

(71) Applicant: UNITED STATES PIPE AND FOUNDRY COMPANY, LLC, Birmingham, AL (US)

(72) Inventor: Kenneth J Watts, Alpine, AL (US)

(73) Assignee: UNITED STATES PIPE AND FOUNDRY COMPANY, LLC, Birmingham, AL (US)

( * ) Notice: Subject to any disclaimer, the term of this patent is extended or adjusted under 35 U.S.C. 154(b) by 0 days.

(21) Appl. No.: 17/490,912

(22) Filed: Sep. 30, 2021

(51) Int. Cl.
*G01N 27/85* (2006.01)
(52) U.S. Cl.
CPC .................... *G01N 27/85* (2013.01)
(58) Field of Classification Search
CPC ........................................................ G01N 27/85
See application file for complete search history.

(56) References Cited

U.S. PATENT DOCUMENTS

| | | | |
|---|---|---|---|
| 5,336,998 A * | 8/1994 | Watts | G01N 27/82 324/242 |
| 6,894,508 B2 * | 5/2005 | Sanoner | G01V 3/15 324/67 |
| 10,067,090 B2 * | 9/2018 | Timmons | G01N 33/20 |
| 2006/0284757 A1 * | 12/2006 | Zemany | G01S 13/32 342/28 |
| 2016/0245780 A1 * | 8/2016 | Wayman | G01N 27/82 |
| 2021/0096273 A1 * | 4/2021 | Chen | G01V 3/088 |

* cited by examiner

*Primary Examiner* — Dominic E Hawkins
(74) *Attorney, Agent, or Firm* — Paul Sykes; Bradley Arant Boult Cummings LLP

(57) ABSTRACT

A method and apparatus for detecting a discontinuity in the wall of a ferrous object is disclosed, which utilize a bank of sensors where each sensor is configured to detect a difference in magnetic flux across a predefined area. Sets of readings from the sensors are converted to images, from which the existence and location of a discontinuity can be detected.

17 Claims, 4 Drawing Sheets

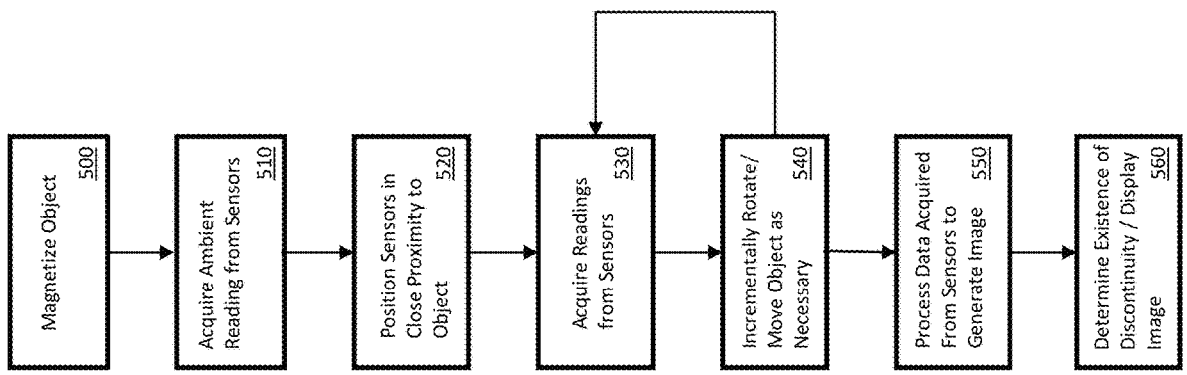

METHOD AND APPARATUS FOR IDENTIFYING DISCONTINUITY IN WALL OF FERROUS OBJECT

TECHNICAL FIELD

The invention relates generally to the field of ferrous objects, and more specifically, to the field of centrifugally cast iron pipe.

BACKGROUND

The process of centrifugal casting of metal objects, and in particular of iron pipe, is well known and has been practiced for a century. A centrifugal casting machine includes a delivery system, such as a trough, and a rotating mold. Molten iron is poured from a machine ladle into the trough. The trough extends into the interior of the rotating mold, generally axially. One end of the mold usually includes a core, such as a sand core, to accurately shape what is called the bell of the pipe. The opposite end of the pipe is referred to as the spigot, and the elongated section in between is the barrel. The molten iron flows down the trough under the influence of gravity. The mold and trough are moved relative to one another to fill the mold with iron, typically from the bell end along the barrel to the spigot. As the mold rotates, centrifugal force disposes the iron circumferentially around the mold in a relatively even manner. Typically, the casting machine is moved via hydraulics or other mechanical means, as is known in the art, to dispose the iron as desired.

The casting of an object, including centrifugally casting of ductile iron pipe, is not always error free or without fault. One problem that may occur is the development of a crack, split, or other discontinuity in the pipe wall. These discontinuities may not be visible to an operator, in some cases because of their size and in others because the discontinuity may be entirely within the pipe wall itself. Such discontinuities can impair the structural integrity of the object or cause functional deficiencies. Consequently, it is desirable to identify and locate them.

The inventor of the inventions disclosed herein previously developed and was a named inventor of U.S. Pat. No. 5,336,998, the contents of e hereby incorporated herein by reference, which disclosed a sensor for detecting faults in ferrous objects using Hall effect elements. It was found that this invention, while helpful, was not always easy to use in practice, especially in a manufacturing environment. For example, some technicians had difficulty in understanding the output of the sensor or in locating a discontinuity detected by the sensor or the '998 Patent.

Thus, there is a need for an apparatus and method that detects the existence of discontinuities in ferrous objects and identifies their location on the object, including in a manner that can be readily understood and applied in a manufacturing environment.

SUMMARY

Embodiments of the present invention satisfy these needs, but it should be understood that not all embodiments satisfy each need. One embodiment comprises an apparatus for generating an image of a discontinuity in a wall of a ferrous object, in which a bank of sensors movable from a first position away from the wall to a second position in close proximity to the wall is configured to detect a difference in magnetic flux across a predefined area of each sensor in the sensor bank. The apparatus further includes a processor in operative communication with the sensor bank, where the processor configured to store a reading from each sensor, with the sensor bank in the first position, in a first array as a value representative of an ambient condition for that sensor; store a reading from each sensor, with the sensor bank in the second position, in a second array as a value associated with a predefined area of the wall corresponding to the sensor; convert the first and second array to a first and second image, respectively; generate a third image from a difference computed between the first and second images; and analyze the third image to determine the existence of a discontinuity in the pipe wall. The apparatus may further comprise a display for displaying the third image to an operator.

In a preferred embodiment, each sensor of the apparatus comprises a central ferrite bead with a first pair of outer ferrite beads disposed on opposite sides thereof and a second pair of outer ferrite beads disposed orthogonally to said first pair, with a Hall effect semiconductor positioned between each of the outer beads and the central bead. The ferrite beads and Hall effect semiconductors may be mounted to a circuit board and encased in a rigid magnetically transparent material formed to provide the sensor with a T-shaped cross section that can be suspended from a linear tray having a gap extending longitudinally approximate its centerline, with either side of the T-shaped sensor resting on the tray with the central portion of the sensor extending through the gap.

In one embodiment, the ferrous object is a pipe, and the apparatus comprises rollers capable of being controllably actuated to incrementally rotate the pipe under the bank of sensors.

Another embodiment of the present invention comprises a method of identifying a discontinuity in a wall of a ferrous object, comprising positioning a bank of sensors in a first position spaced apart from the wall, each sensor configured to detect a difference in magnetic flux across a predefined area; storing a reading from each sensor in a first array as a value representative of an ambient condition for that sensor; magnetizing said ferrous object; positioning the bank of sensors in a second position in close proximity to the wall; storing a reading from each sensor in a second array as a value associated with a predefined area of the wall corresponding to the sensor; converting the first and second array to a first and second image, respectively; generating a third image from a difference computed between the first and second images; and analyzing the third image to determine the existence of a discontinuity in the pipe wall. The reading may be received from each of the sensors as an analog value and converted to a digital value for storage in the array.

In one embodiment, the analyzing step comprises identifying in the third image a change in polarity within a predefined proximity, for example, by detecting a zero crossing in the third image. In another embodiment, the analyzing step comprises computing a correlation coefficient between the third image and a reference image of a wall without a discontinuity.

In a preferred embodiment, each sensor is configured to detect a first difference in magnetic flux across a predefined area along a first axis, and is further configured to detect a second difference in magnetic flux across a second axis orthogonal to the first, and is further configured to provide a reading of the difference between the first difference and the second difference. In a still preferred embodiment, the object may be a pipe having a length and a circumference, and the bank of sensors has a length that is substantially the same as the pipe and a width that is a fraction of the circumference, and the method further comprises, with the bank of sensors in the second position, rotating the pipe in increments substantially equal to said width and at each increment, storing a reading from each sensor in the second array.

BRIEF DESCRIPTION OF THE DRAWINGS

The present invention will be explained, by way of example only, with reference to certain embodiments and the attached figures, in which:

FIG. 5 is a flow chart of an embodiment of a method of the present invention.

DETAILED DESCRIPTION

This disclosure will describe certain embodiments of the invention with respect to an exemplary application of a centrifugally cast iron pipe. Embodiments of the present invention may be readily applied to any object having a ferrous wall or surface in which it is desirable to detect discontinuities or anomalies that may not be visible to the eye. Further, a reference to a ferrous object should be understood as a reference to objects made from iron or alloys of iron, typically comprising quantities of carbon, silicon, and phosphorous, but which also may comprise quantities of other elements or compounds that may affect its properties, including particularly objects in which the ferrous or metallurgical content has a microstructure that is non-homogenous or variable.

In general, embodiments of the apparatus and method of the present invention allow detection of discontinuities, such as cracks and splits, in the wall of a ferrous object by scanning the surface and obtaining differential readings of magnetic field strength, indicative of magnetic flux leakage, over a plurality of relatively small, predefined areas. An image of the object's wall is generated from these readings. Various techniques may be used to isolate and enhance data indicative of uniformity, or the lack thereof, of flux leakage from the wall. The final image may be analyzed to identify the existence of a discontinuity and also may be visually displayed to an operator or technician to show the location of the discontinuity on the object itself.

Figure 1:
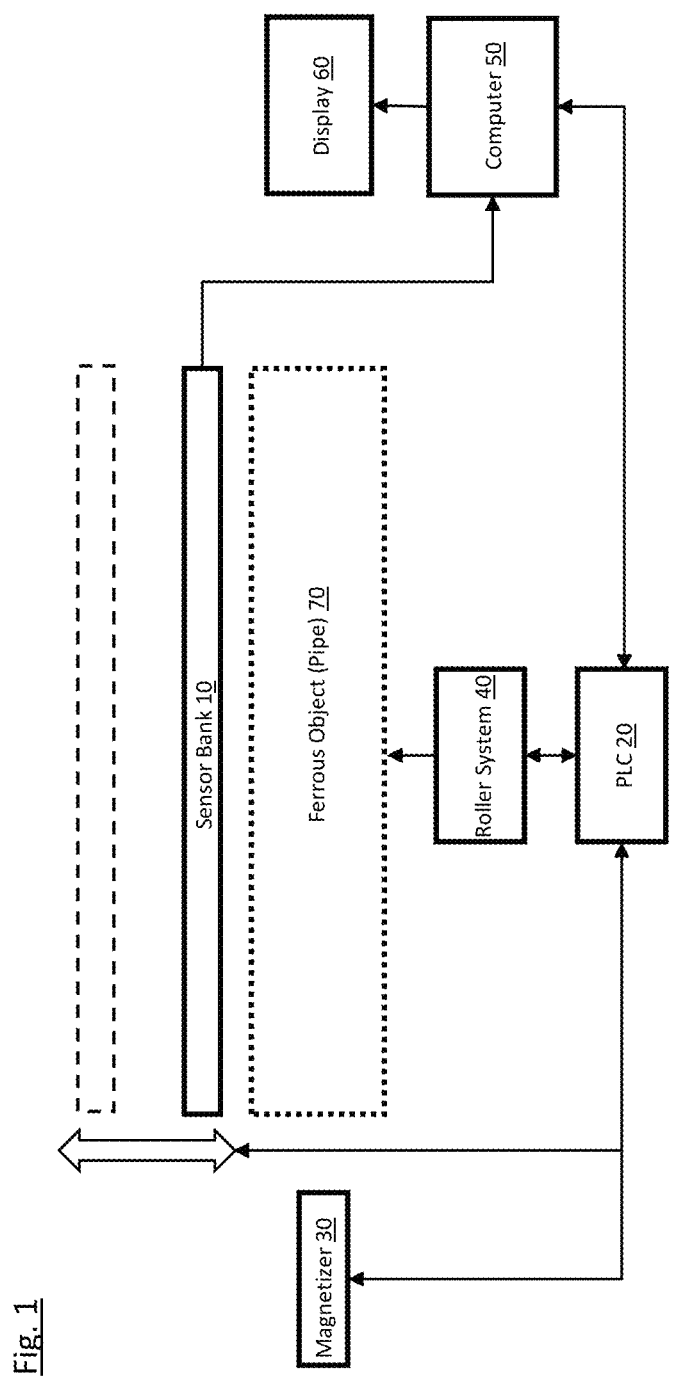
FIG. 1 is a block diagram of an embodiment of an apparatus of the present invention.
Figure 2:
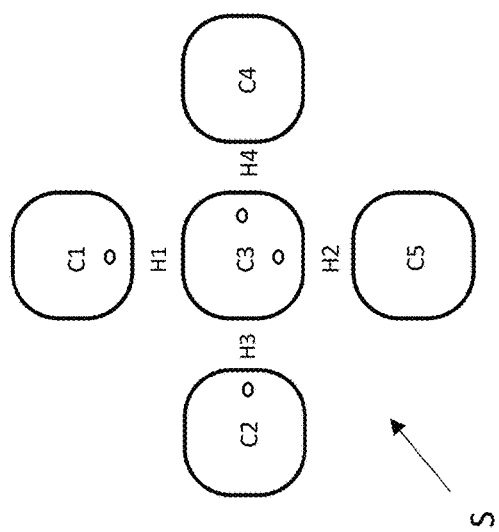
FIG. 2 is a block diagram of an embodiment of sensor used in a sensor bank of the apparatus of FIG. 1.
Figure 3:
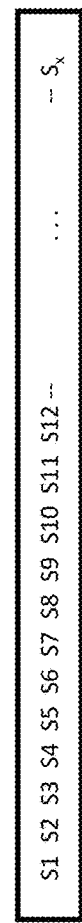
FIG. 3 is a block diagram of a plurality of the sensors of FIG. 2 configured in a sensor bank for use in the apparatus of FIG. 1.

FIG. 1 is a block diagram of an embodiment of an apparatus of the present invention, comprising a sensor bank 10 (comprising a plurality of individual sensors S1 to $S_x$ as shown in FIGS. 2-3), a programmable logic controller (PLC) 20, a magnetizer 30, a roller or other conveyor system 40, a computer 50, and an optional display 60. Also shown is a ferrous object 70, such as a centrifugally cast ductile iron pipe.

In a preferred embodiment, the sensor bank 10 preferably is movable from a first position (shown in dotted lines in FIG. 1) spaced away from the ferrous object to a second position in close proximity to the wall of the object. The first position should place the sensor bank 10 sufficiently apart from the wall of the object so that it is outside the operable range of the sensors $S_n$. The second position should place the sensor bank 10 sufficiently close to the wall of the object so that it is within the operable range of the sensors $S_n$, for example, within ⅜ to ¼ inch. Alternatively, the sensor bank 10 could be stationary and the ferrous object 70 could be moved relative to the sensor bank 10.

When the ferrous object is a pipe, the apparatus may comprise a roller system 40 to rotate the pipe under the sensor bank 10 to allow readings to be taken around the entire circumference of the pipe. Other conveyance systems of conventional design similarly could be used to bring the entire surface of interest within the range of the sensor bank 10, either by moving the sensor bank 10 itself or the object, depending on the size, shape, and other characteristics of the object.

The magnetizer 30 may be of conventional design and is sufficient to impart a magnetic field into the wall of the ferrous object 70. For example, when the object 70 is a pipe, the magnetizer 30 may capacitively discharge a large direct current through a wire located axially in the center of the pipe, leaving a remnant magnetic field in the pipe wall.

The PLC 20 is in operative communication with actuators to move the sensor bank 10 from the first position to the second position, to cause the magnetizer 30 to magnetize the object 70, and to cause the roller system 40 to move the object 70 under the sensor bank as desired. The PLC 20 is also in operative communication with the computer 50 to receive instructions from and report data or status back to the computer 50.

The computer 50 is in operative communication with the sensor bank 10 for receiving readings from it, and as noted with the PLC 20. Computer 50 is used broadly here to refer to any computational system capable of receiving, directly or indirectly, and processing the data and performing the calculations and other steps of the methods described herein, and would include a local standalone general purpose computer programmed with appropriate software, such a general purpose computer in communication with a server over a network dividing tasks or storage between them, a cloud-based processor remote from the casting site and receiving the appropriate data over a communications network, a mobile or handheld device, an application specific computing device, or any combination of the foregoing. The computer 50 includes a processor and a memory.

FIG. 2 is a block diagram of a preferred embodiment of an individual sensor S. A sensor S comprises four linear ratiometric Hall effect semiconductors, H1-H4, placed between five sintered ferrite beads C1-C5, as shown. The polarity of each Hall effect semiconductor is shown by an adjacent dot, with the dot indicating the north pole. Beads C1-C5 act as flux concentrators, with a high magnetic permeability relative to ambient air, for example with a μr of approximately 850. An individual sensor S is configured to measure the value of a magnetic field substantially within the area enclosed by the boundary of its parts. The sensor S measures magnetic field strength in four places corresponding to the location of the Hall effect semiconductors H1-H4. Each Hall effect semiconductor H1-H4 outputs a voltage $V_{Hx}$ proportional to detected magnetic field strength. In an exemplary embodiment, the Hall effect semiconductors H1-H4 may be Allegro Micro Systems A1389LUA-9-T sensors.

A plurality of sensors $S_x$ may be placed adjacent to one another to construct a sensor bank. In the preferred embodiment shown in FIG. 3, a plurality of sensors $S_x$ are arranged in a linear array to construct a sensor bank 10. A dimension of a sensor bank, and hence the number of sensors it includes, may be selected to match a typical dimension of an object that it is regularly used with. For example, the length of the sensor bank 10, and hence the number x of sensors $S_x$ it includes, may be selected to match the length of a typical pipe. In an exemplary embodiment, a sensor S is 1.5 inches long (and 1.5 inches wide), and for a 20-foot pipe, the sensor bank 10 would contain 160 sensors.

The sensors may be used in a harsh environment. To protect them, each assembly as shown in FIG. 2 may be encased in a rigid magnetically inert or transparent material, such as coal tar epoxy. Further, the casing may be formed to have a T-shaped cross section, with the each of the individual sensors S in the vertical part of the T. A linear tray having a gap extending longitudinally approximate its centerline may be provided to house the sensor array 10, with either side of the T-shaped sensor resting on the tray with the central portion of the sensor extending through the gap. This provides a simple and effective way of protecting and housing the sensor bank 10.

A primary purpose of the present invention is to detect discontinuities in objects made from ferrous materials, including a ferrous object including a non-homogenous metallurgical microstructure such as ductile iron. As the microstructure is non-homogenous, so too is its magnetic permeability. As a result, a simple measurement of magnetic field strength over the surface of the object's wall will yield variability that is not necessarily indicative of a discontinuity of interest. The sensor S therefore is configured to provide a relative reading of magnetic field strength. The variability in magnetic field strength over a small area resulting from variability in the metallic microstructure will result in a differential reading of magnetic field strength over that area that is quite small in magnitude, typically close to zero. In contrast, a split, crack or other discontinuity in the wall of the ferrous object will cause magnetic flux to leak into the surrounding air. A rapid or significant change in flux value across a relatively small area is indicative of such leakage, which results in relatively large non-zero value for a differential reading of magnetic field strength over the area. In a preferred embodiment, as shown in FIG. 2, this is accomplished by providing two readings along each of two axes, from which the differential magnetic field strength in the area covered by the sensor can be determined, as follows:

$$V_S = (V_{H_1} - V_{H_2}) - (V_{H_3} - V_{H_4})$$

Figure 4:
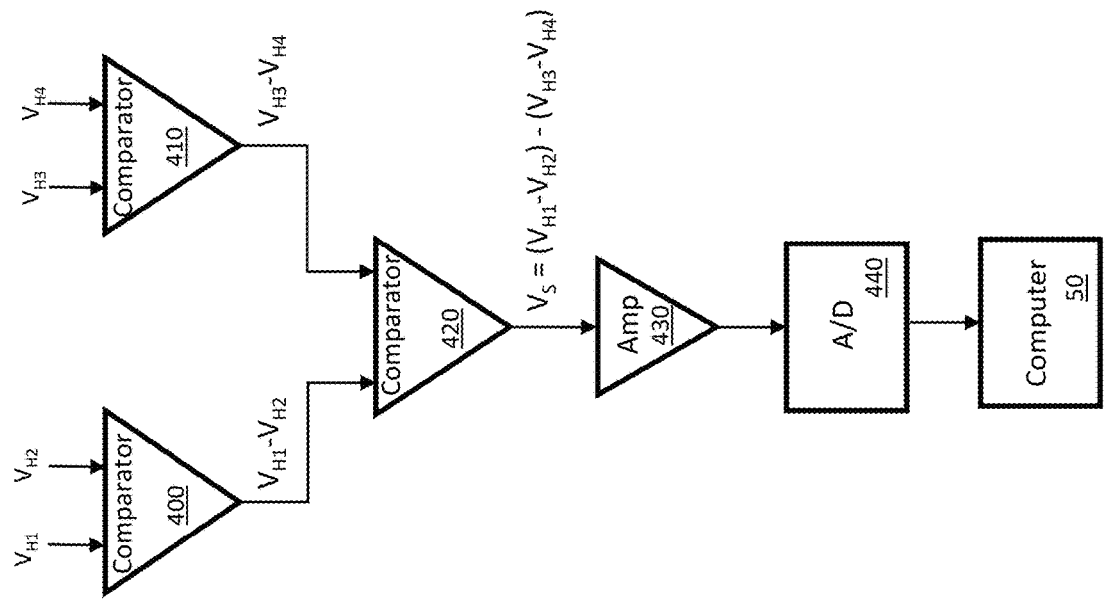
FIG. 4 is a block diagram of a circuit for receiving a reading of the sensor of FIG. 2.

As referenced in FIG. 4, in a preferred embodiment, for each sensor S, two differential comparator circuits 400 and 410, receive the output voltages of the Hall effect semiconductor $V_{Hx}$ as inputs in accordance with the equation above. The outputs of these two comparators are then input into a third differential comparator circuit 420 to provide a voltage $V_S$ indicative of the differential magnetic field detected by the sensor S. When the magnetic field across the sensor is relatively constant, the voltage $V_S$ will be close to zero. A relative change in magnetic field strength across the sensor S, indicative of a change in flux leakage, will yield a voltage $V_S$ with a higher magnitude. In a still preferred embodiment, an amplifier 430 may apply an appropriate gain to the voltage $V_S$. The amplified voltage is converted to a digital value by analog-to-digital converter 440 and then provided to computer 50. The amplified values of $V_S$ and their corresponding digital equivalents may be appropriately scaled to fit a predefined range, for example, voltages of $-10$ v to $+10$ v may be converted to digital values $-255$ to $+255$.

It should be noted that some or all of the circuitry for elements 400, 410, 420, 430, and 440 may be contained within the computer 50, for example, on a board mounted in a card slot in computer 50. Alternatively, some or all of these elements may be disposed on a separate circuit board or device, which provides an output (including a wireless signal) to a data acquisition card or other receiver in computer 50, as would be understood by a person of ordinary skill in the art.

FIG. 5 is a block diagram of a preferred embodiment of a method of the present invention, which utilizes the devices described above to determine the existence of a discontinuity in the wall of a ferrous object, such as a ductile iron pipe. As will be apparent, certain of the steps shown in FIG. 5 are preferably performed with control from the PLC 20, and other steps involve acquisition and processing of data by the computer 50. The computer 50 may be a general purpose computer containing a processor capable of executing software for processing the data as described herein.

In step 500, with the sensor bank 10 in its first position spaced apart from the object 70, the PLC 20 causes the magnetizer 30 to magnetize the ferrous object. Preferably a check is performed to ensure the magnetization was sufficient. In step 510, the computer 50 acquires a reading from all sensors $S_x$ in the sensor bank 10. These readings are indicative of the background or ambient differential magnetic field as detected by a sensor $S_x$ and serve as its baseline or reference reading. Computer 50 stores these readings in an array in memory as a value representative of the ambient condition of the sensor from which it was taken.

Next, in step 520, the PLC 20 causes the sensor bank 10 to be moved into the second position, in close proximity to the wall of the object, preferably within the optimal range of the Hall effect semiconductors H1-H4 on each sensor $S_x$. The computer 50 then acquires readings from each sensor $S_x$ in step 530 and stores each of these readings in a second array in memory as a value associated with a predefined area of the wall corresponding to the sensor, that is, with respect to the location of the sensor in the sensor bank 10.

Next, if the surface area of the wall of the object 70 is larger than the area read by the sensor bank 10, in step 540, the object 70 and sensor bank 10 can be moved relative to one another incrementally to allow readings to be taken over the entire area of interest of the object 70. For example, if the object 70 is a pipe, and the sensor bank 10 has a length equal to that of the pipe and a width W, the PLC 20 may cause the pipe to be rotated by roller system 40 in increments equal to W, a reading taken and stored in the second array upon each increment, until readings are taken and stored for the entire circumference of the pipe.

In step 550, the values stored the first and second arrays are processed to generate images. That is, each array constitutes a matrix or grid of discreet values that correspond to a differential magnetic field reading for a given sensor (the first array) or for a specific area of the object 70 (the second array). Image processing software (including for example as part of the commercially available software application MATLAB) is used to convert the array to an image. Typically a black-and-white (gray scale) image is sufficient. For example, where the values in the array range from $-255$ to $+255$, black may be assigned to value $-255$ and white to $+255$, with values between incrementally changing from black to white in hues of gray. The negative extreme value is indicative of one polarity (for example, south magnetic polarity) while the positive extreme value is indicative of the opposite polarity (for example, north magnetic polarity). While values in the arrays could be analyzed individual by rows and columns, such processing is more time consuming and machine cycle intensive than processing the data points collectively in the form of an image. Various filtering and processing techniques can be applied to the digital image data to improve the clarity and accuracy of identification of discontinuities.

At this point, there is a baseline image generated from the array of the readings of ambient differential field strength, and a second image of the object generated from the array of the readings of differential field strength in close proximity to the object's wall. Preferably, fast Fourier transforms (FFTs) are applied to each image. Digital filtering may be applied to each FFT so that low frequency components (slow variations in data) are removed and high frequency components (rapidly varying data) are enhanced. The baseline FFT is subtracted from the object FFT. This removes background noise attributable to the sensors. An inverse FFT is applied to the result of the subtraction which provides a third and final image.

In step 560, the existence of a discontinuity is determined from this third image. This determination may be made visually by an operator upon displaying the image on a screen, or more objectively by a mathematical analysis. It has been found that variations in differential magnetic field strength attributable to non-homogeneous metallurgical microstructure are restricted to values of a single polarity, for example +1 to +255 or −1 to −255. If and only if there is a material discontinuity in the object's wall (that is, a split or crack), there will be a change in polarity and the array values will cross through zero. Visually, this will appear as adjacent areas with stark contrast at the location of the split. The image shows the actual location of the split on the object, which may not be visible (for example, the split or crack may be entirely internal to the object's wall).

Mathematically, zero-crossing algorithms can be run to identify where the differential magnetic field readings change from a north polarity to a south polarity. This occurs on either side of a split, that is, one side of the split is a north pole and the other side of the split is a south pole. The presence of a zero-crossing in the image data is confirmation of the existence of a split.

An alternative mathematical analysis has been developed, which is particularly useful in determining if an object does not have a discontinuity. When the initial image from the array of sensor readings of the object is generated, a correlation coefficient between this image and the image of a known good object (that is, one without a discontinuity) can be calculated. The correlation exceeding a threshold value indicates the object under examination is without a discontinuity. If the correlation falls below a given value, the full data and image processing as described above can be performed to determine with certainty whether and where a discontinuity exists. This approach allows increased cycle time and faster processing.

Figure 6B:
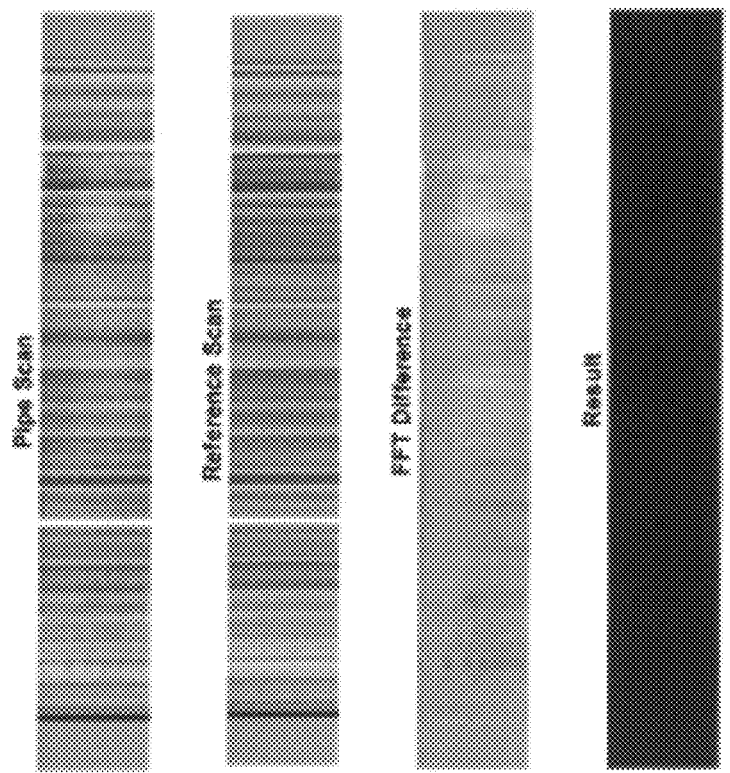
FIG. 6B is an example of an image of a wall of a ferrous object generated from the method of claim 5, in which the wall does not exhibit a discontinuity.
Figure 6A:
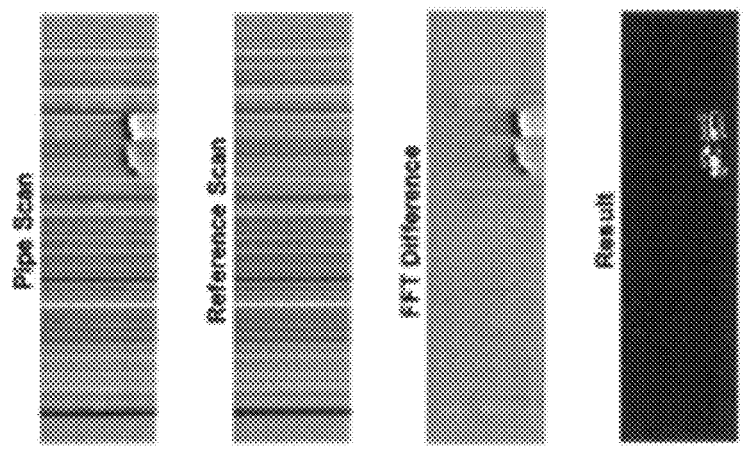
FIG. 6A is an example of an image of a wall of a ferrous object generated from the method of claim 5, in which the wall exhibits a discontinuity.

FIGS. 6A-6B are exemplary images generated by the method described above, where the ferrous object was a ductile iron pipe. In FIG. 6A, the top image labeled "Pipe Scan" is the initial image generated from the sensor readings around the circumference of the pipe. The next image down, labeled "Reference Scan", is the image generated when a reading is taken from the sensors spaced apart from the pipe, that is, the ambient or background reading of the sensors themselves. Both of these images show variations in differential magnetic field strength across the surface as striations of various hues of gray. Further, the existence of a discontinuity is shown fairly clearly in the top "Pipe Scan" image, even before further processing. The image in FIG. 6A labeled "FFT Difference" is the result of the subtraction of an FFT of the "Pipe Scan" and "Reference Scan" images. As shown, almost all background noise has been removed as a result of displaying the difference between the "Pipe Scan" and "Reference Scan" images. Applying an inverse FFT to the "FFT Difference" image results in the final image, labeled "Result." As shown, almost all of this image is black, and there is a stark change in contrast—here black to white—at the location of the split. Zero-crossings occur at these transitions in color.

FIG. 6B is an analogous set of images for a pipe that does not contain a split. As shown, the final image labeled "Result" is uniform in color.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A method of identifying a discontinuity in a wall of a ferrous object using a hank of sensors, each sensor configured to detect a difference in magnetic flux across a predefined area, comprising:
   with the bank of sensors spaced apart from the wall, storing a reading from each sensor ii a first array as a value representative of an ambient condition for that sensor;
   magnetizing said ferrous object;
   with the bank of sensors in close proximity to the wall, storing a reading from each sensor in a second array as a value associated with a predefined area of the wall corresponding to the sensor;
   converting the first and second array to a first and second image, respectively;
   generating a third image from a difference computed between the first and second images; and
   analyzing the third image to determine the existence of a discontinuity in the wall.

2. The method of claim 1, wherein the reading received from each of the sensors is an analog value, and further comprising converting said analog value to a digital value.

3. The method of claim 1, further comprising displaying the third image on a display visible to an operator.

4. The method of claim 1, wherein said object is a pipe having a length and a circumference, and the bank of sensors has a length that is substantially the same as the pipe and a width that is a fraction of the circumference, and further comprising, with the hank of sensors in close proximity to the wall, rotating the pipe in increments substantially equal to said width and at each increment, storing a reading from each sensor in the second array.

5. The method of claim 2, wherein the analyzing step comprises computing a correlation coefficient between the third image and a reference image of a wall without a discontinuity.

6. The method of claim 2, wherein the analyzing step comprises identifying in the third image a change in polarity within a predefined proximity.

7. The method of claim 6, wherein the change in polarity is determined by detecting a zero crossing in the third image.

8. The method of claim 1, Wherein each sensor is configured to detect a first difference in magnetic flux across a predefined area along a first axis, and is further configured to detect a second difference in magnetic flux across a second axis orthogonal to the first, and is further configured to provide a reading of the difference between the first difference and the second difference.

9. The method of claim 1, further comprising, after the magnetizing step, moving the bank of sensors to position it in close proximity to the wall.

10. An apparatus for generating an image of a discontinuity in a wall of a ferrous object, comprising:
- a bank of sensors capable of being positioned relative to the wall in a first position away from the wall and in a second position in close proximity to the wall, each sensor configured to detect a difference in magnetic flux across a predefined area;
- a processor in operative communication with the sensor bank, the processor configured to:
  - store a reading from each sensor, with the sensor bank in the first position, in a first array as a value representative of an ambient condition for that sensor;
  - store a reading from each sensor, with the sensor bank in the second position, in a second array as a value associated with a predefined area of the wall corresponding to the sensor;
  - convert the first and second array to a first and second image, respectively;
  - generate a third image from a difference computed between the first and second images; and
  - analyze the third image to determine the existence of a discontinuity in the wall.

11. The apparatus of claim 10, wherein each sensor comprises a central ferrite head with a first pair of outer ferrite beads disposed on opposite sides thereof and a second pair of outer ferrite beads disposed orthogonally to said first pair, a Hall effect semiconductor positioned between each of the outer beads and the central bead, the ferrite beads and Hall effect semiconductors mounted to a circuit board and encased in a rigid magnetically transparent material formed to provide the sensor with a T-shaped cross section.

12. The apparatus of claim 11, wherein the bank of sensors comprises a linear arrangement of the sensors, and further comprising a linear tray having a gap extending longitudinally approximate the centerline, with either side of the T-shaped sensor resting on the tray with the central portion of the sensor extending through the gap.

13. The apparatus of claim 10, further comprising a support for holding the ferrous object under the bank of sensors, the support configured to move the object relative to the bank of sensors so that a wall of the object is in either the first position or the second position.

14. The apparatus of claim 13, wherein the ferrous object is a pipe, and wherein the support comprises rollers capable of being controllably actuated to incrementally rotate the pipe under the bank of sensors.

15. The apparatus of claim 10, further comprising a support for holding the bank of sensors, the support configured to move the bank of sensors relative to the object so that a wall of the object is in either the first position or the second position.

16. The apparatus of claim 10, wherein the reading is received as an analog value and the processor is configured to convert the analog value to a digital value before it is stored in the memory.

17. The apparatus of claim 10, further comprising a display for displaying the third image to an operator.

* * * * *